United States Patent [19]

Chace et al.

[11] 4,123,163

[45] Oct. 31, 1978

[54] LENS POWER DISPLAY IN PRESCRIPTION FORM

[75] Inventors: Howard E. Chace, Southbridge; Anthony F. Szwarc, Sturbridge, both of Mass.

[73] Assignee: American Optical Corporation, Southbridge, Mass.

[21] Appl. No.: 741,257

[22] Filed: Nov. 12, 1976

[51] Int. Cl.² .............................................. G01B 9/00
[52] U.S. Cl. .................................... 356/124; 356/127
[58] Field of Search ................ 356/124, 125, 126, 127

[56] References Cited

U.S. PATENT DOCUMENTS

| | | | |
|---|---|---|---|
| 2,624,237 | 1/1953 | Davis | 356/125 |
| 3,832,066 | 8/1974 | Cornsweet | 356/125 |
| 3,877,788 | 4/1975 | Spraque | 356/125 X |

*Primary Examiner*—Conrad J. Clark
*Assistant Examiner*—Rodney B. Bovernick
*Attorney, Agent, or Firm*—Jeremiah J. Duggan; Stephen A. Schneeberger

[57] ABSTRACT

Apparatus for measuring the refractive powers of a lens and displaying the measured powers in so-called prescription form. A focimeter is equipped with means for generating electrical signals indicative of the net refractive powers of the lens, which signals are extended to novel electronic logic and control means for ultimately reading out and/or displaying the lens powers in a prescription form having "sphere" and "cylinder" components of power. Selectively activable control means determine whether the prescription is displayed in so-called "+ cylinder" notation or "− cylinder" notation. Additional means are provided for indicating which of two possible axis angles is correctly associated with the particular displayed component of cylinder power.

7 Claims, 4 Drawing Figures

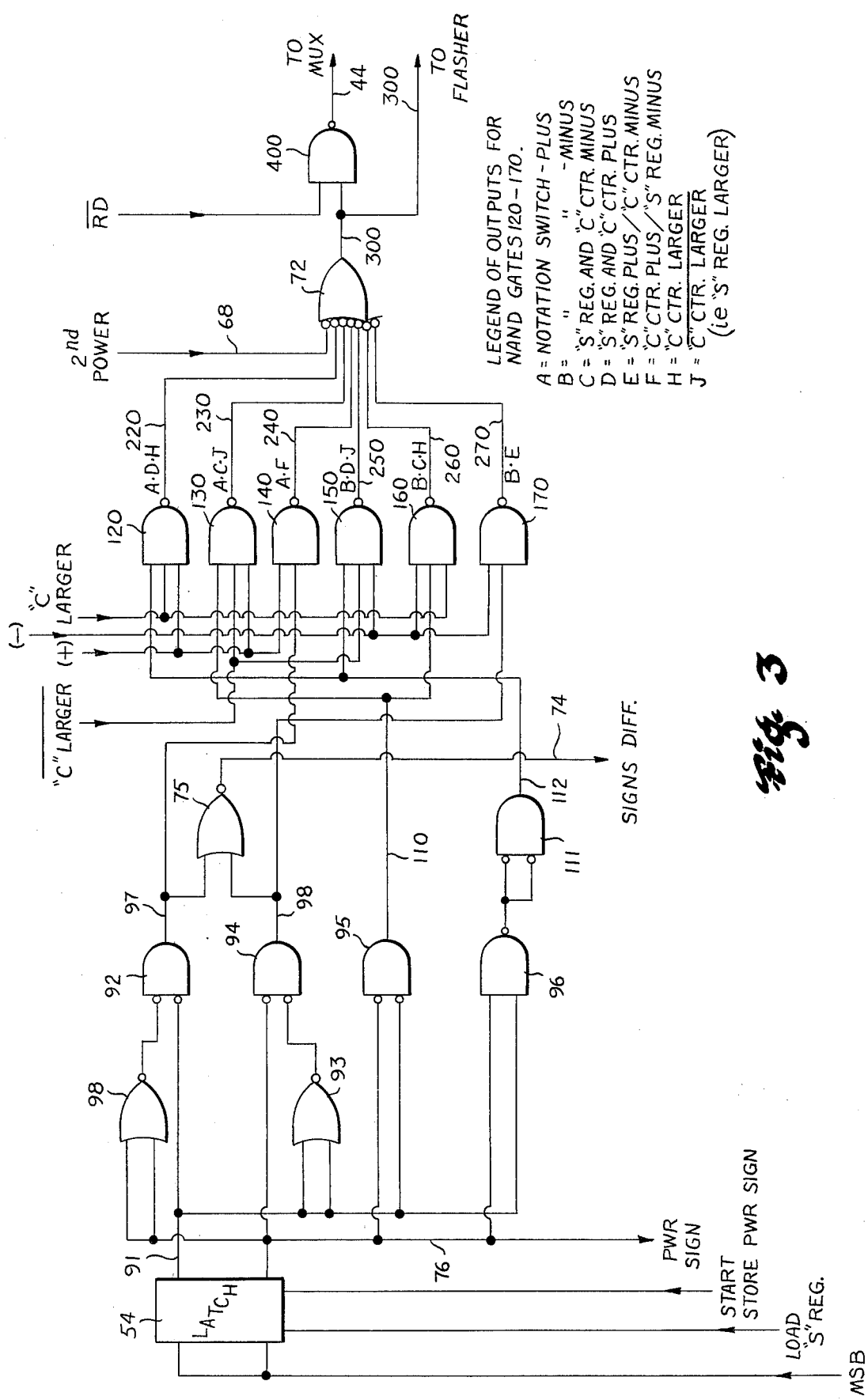

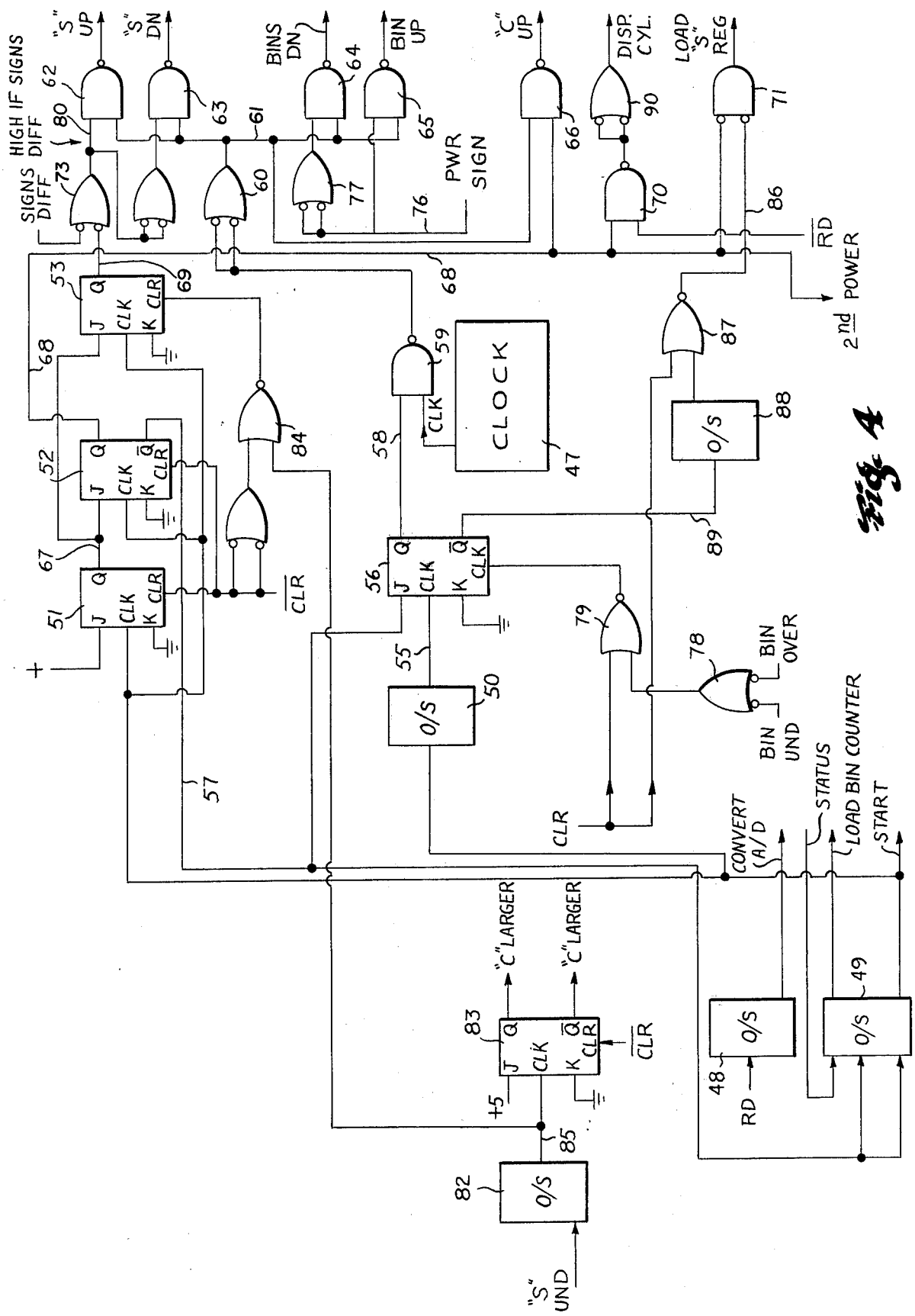

LENS POWER DISPLAY IN PRESCRIPTION FORM

BACKGROUND OF THE INVENTION

The present invention is related to apparatus for determining the optical powers of a test lens and more particularly concerned with the apparatus for converting signals indicative of the net refractive power of a test lens along each of its orthogonal meridians to a so-called prescription form comprising a sphere power and a cylinder power.

Literally millions of lenses are manufactured in the United States annually. A large percentage of these lenses are ophthalmic lenses for use in spectacles. Since these ophthalmic lenses are intended to correct and/or protect the vision of the wearer, the lenses must be carefully examined and accurately measured in order to meet the wearer's needs, particularly the refractive power along each of the two principal meridians and the angular orientation of a referenced one of the principal meridians.

Various lens measuring instruments have been used to provide the lens parameter data discussed above. A general type of such instrument is known as a focimeter, the basic principle of which has been long known, as evidenced in Troppman U.S. Pat. No. 1,083,309 issued Jan. 6, 1914. These instruments operate by determining the focal length of a test lens along its two principle meridians when placed in a particular optical system. The determined focal lengths accordingly correspond with the net refractive powers of the lens along the respective principle meridians. Most of these instruments have been, and are, manually operated and employ a subjective determination of the "focus" condition, although instruments have been recently developed which are capable of determining lens power automatically and objectively, as typified in U.S. application Ser. No. 703,492 filed July 8, 1976.

Even though the basic parameters of the test lens measured by the aforementioned instruments are its net refractive powers along the respective principal meridians, it has long been the practice of doctors and others associated with eye care to express a patient's needs in a so-called prescription form. This prescription form specifies a "sphere power" and a "cylinder power" and also the angle of the so-called cylinder meridian (axis) relative to the horizontal.

The doctor may express a patient's prescription in either a so-called "+ cylinder" from in which the "cylinder" component of power is always expressed as "+", or a so-called "— cylinder" form in which the "cylinder" component is expressed as "—". The particular form used will depend on the doctor and the refraction equipment used. The prescribed cylinder power is thus correspondingly additively or subtractively referenced to the sphere power, and its (cylinder) meridian or axis angle is expressed relative to the horizontal. However, the lens manufacturer and/or supplier may work with a system in which the cylinder component of power is expressed in the oppositely-signed form from that expressed in a particular doctor's prescription.

The various available aforementioned focimeters have heretofore only provided a direct indication of the net refractive power along each of the principal meridians of a test lens relative to some predetermined zero reference, and the translation of those net refractive powers values into the so-called "prescription form" has typically required an operator to determine the magnitude and the sense or sign of the difference between the first and second net power readings in order to provide a signed cylinder component. Furthermore, because the doctor's prescription and the lens supplier's prescription may be expressed in oppositely-signed cylinder notation, it was then necessary to mentally convert from one form to the other by changing the sign of the cylinder component and modifying the value of the sphere component by arithmetic addition of the cylinder component therewith, as well as also modifying the indicated axis angle by 90°. It will be appreciated that the need to convert net refractive power readings to one, and possibly also the other, prescription form (plus and/or minus cylinder notation) is both time consuming and introduces the opportunity for operator error.

Accordingly, the present invention has as its principal objective the provision of apparatus for determining the net refractive powers of a test lens along each of its respective principal meridians and at least semi-automatically expressing those optical characteristics of the lens in prescription form.

It is a further object of the present invention to provide apparatus for simply, quickly and accurately converting lens power characteristics expressed in prescription form from either the plus or minus cylinder notations to the oppositely signed cylinder notation.

It is a still further object of the invention to provide apparatus for indicating the appropriate cylinder axis angle associated with a particular respective lens power prescription.

SUMMARY OF THE INVENTION

According to the invention there is provided apparatus comprising, in combination, a lens measuring instrument for determining the optical powers of a test lens in each of two respectively orthogonal principal meridians, each of the optical powers being expressed as the net refractive power of the lens in the respective meridian; means for providing signed first and second signals whose signed magnitudes are respectively representative of the optical power of the test lens expressed in the terms of net refractive power in the respective meridian; and means responsive to the signed first and second signals representative of the net refractive powers for providing signals representative of the lens' optical powers expressed in prescription form comprising a signed net refractive power (sphere power) and a signed component of cylinder power. The prescription-form expressing means comprises means for selectively alternatively establishing a positive or negative notation control signal; means responsive to the signed first and second signals for providing a difference signal representative of the arithmetic difference therebetween, the difference signal assuming the sign established by the notation control signal for readout as the cylinder component of the prescription form expression; means responsive to the notation control signal, to the sign status of the signed first and second signals and to the relative magnitudes between the signed first and second signals for selecting for readout as the sphere power, when the notation control means indicate the negative notation, the signed first signal if either the signed first signal is positive and the signed second signal is negative or both the signed first and second signals are negative and the signed second signal is larger or both the signed first and second signals are positive and the signed first signal is larger and otherwise the signed second signal and, when the notation control means indicates a positive notation, the signed first signal if either the signed first signal is negative and the signed second signal is positive or both the signed first and second signals are negative and the signed first signal is larger or both the signed first and second signals are positive and the signed second signal is larger and otherwise the signed second signal; and readout means for the signals indicative of signed sphere power and signed cylinder power.

The apparatus may additionally include means for temporarily storing the signed first and second signals representative of the net refractive powers of the lens.

Further, the means for providing the arithmetic difference signal comprises reversible counting means, means for entering the value of the signed first signal in the counting means, means responsive to the relative signs of the signed first and second signals for increasing the count in the counting means by the amount of the second signal if the signs of the first and second signals differ and for decreasing the count in the counting means by the amount of the second signal if the signs of the first and second signals are the same. The counting means indicates underflow if the count therein decreases to zero and the apparatus further includes means responsive to the indication of underflow for increasing the count in the counting means by the remaining value of the second signal.

Further still, the lens measuring instrument includes means for indicating the angle of one of the principal meridians of the lens relative to a reference plane, and the apparatus includes means for indicating with which of the two principal meridians the indicated angle is associated.

BRIEF DESCRIPTION OF THE DRAWINGS

FIG. 1 is a perspective view of the lens measuring instrument embodying the novel apparatus of the invention;

FIG. 3 illustrates, in detail, the display selection logic circuitry of FIG. 2; and FIG. 4 illustrates, in detail, the start and clock logic circuitry of FIG. 2.

DESCRIPTION OF THE PREFERRED EMBODIMENTS

Figure 1:
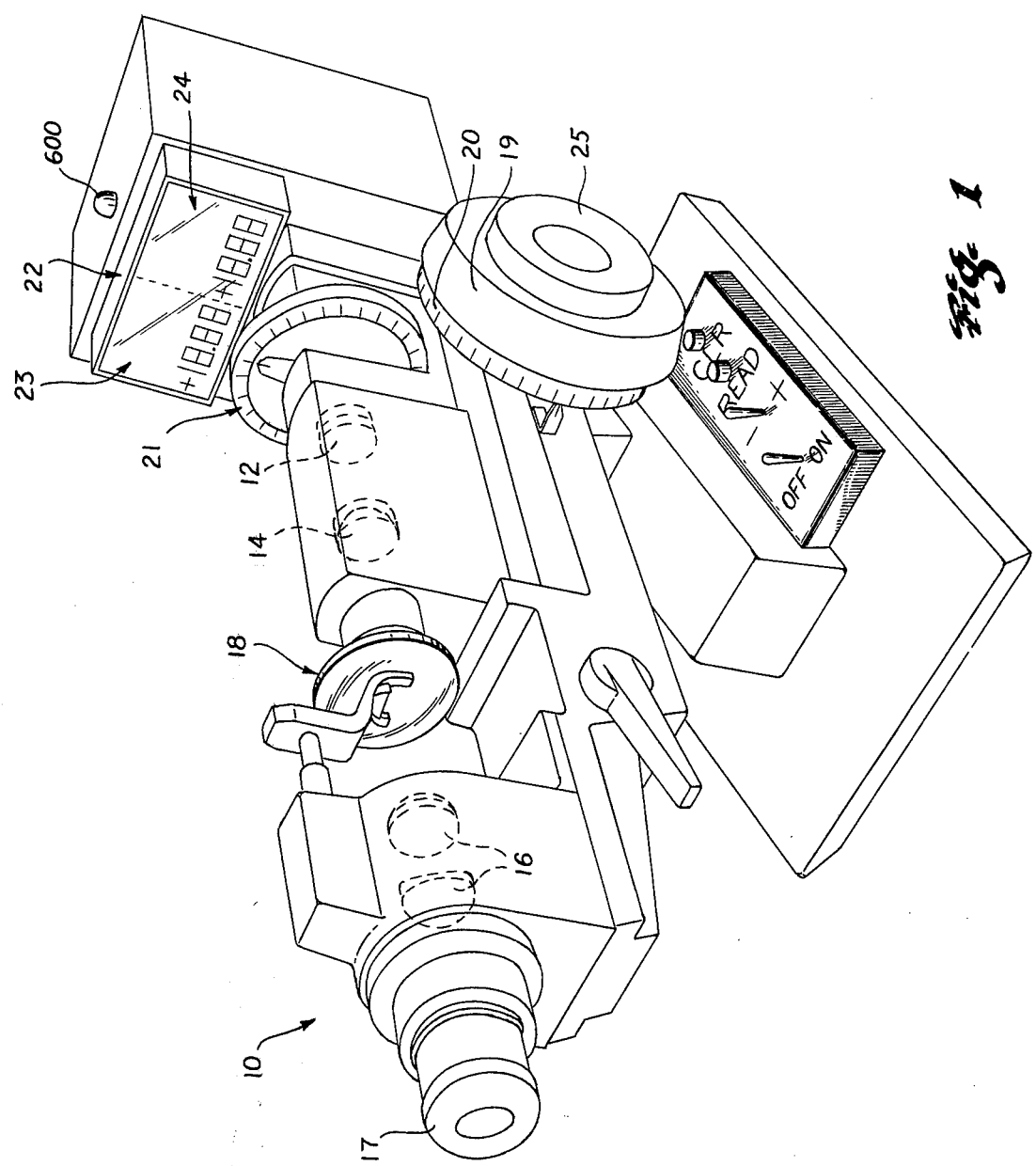
FIG. 1.

Referring to FIG. 1, there is illustrated a lens measuring instrument such as focimeter 10, embodying the basic optical principles disclosed, for instance, in the aforementioned Troppman U.S. Pat. No. 1,083,309. The optical system of the instrument is shown diagrammatically with dotted elements. Briefly stated, the image of a target 12 is projected by the optical system of a collimator 14, and this image is viewed by means of a telescope 16 which is aligned with the collimator 14. The image of the target 12 will be in sharp focus at the zero setting of the target if no lens is being tested. The eyepiece 17 may be adjusted to the operator's eye during the zeroing procedure. To test a lens 18, it is positioned at the front focal point of the optical system, and when the target 12 has been shifted to be in sharp focus again, the displacement of the target reveals the focal power of the lens 18. The displacement of the target 12 from the zero position is controlled by a power wheel 19 on which there may appear a scale 20 calibrated in fraction-of-a-diopter increments to + 20 diopters. An axis wheel and scale 21 calibrated in degrees is provided for rotating target 12 in the event the lens 18 possesses a cylinder component of power, as is well known.

Additionally, the focimeter 10 mounts a visual display 22 which includes a three-and-a-half digit sphere display 23 and a three-and-a-half digit cylinder display 24. A high precision potentiometer 25 is ganged with the power wheel 19 and is connected to a regulated power supply 26 (illustrated in FIG. 2) for providing, at its wiper, a signal indicative of the instantaneous power setting of wheel 19. The signal voltage appearing on the wiper of potentiometer 25 is applied to signal processing circuitry housed within focimeter 10 and corresponding with the circuitry illustrated in FIGS. 2-4, to be hereinafter described, for providing the output appearing on display 22. A light 600 mounted on display 22 signals the correctness or incorrectness of a particular setting of axis wheel 21 relative to the displayed prescription.

Figure 2:
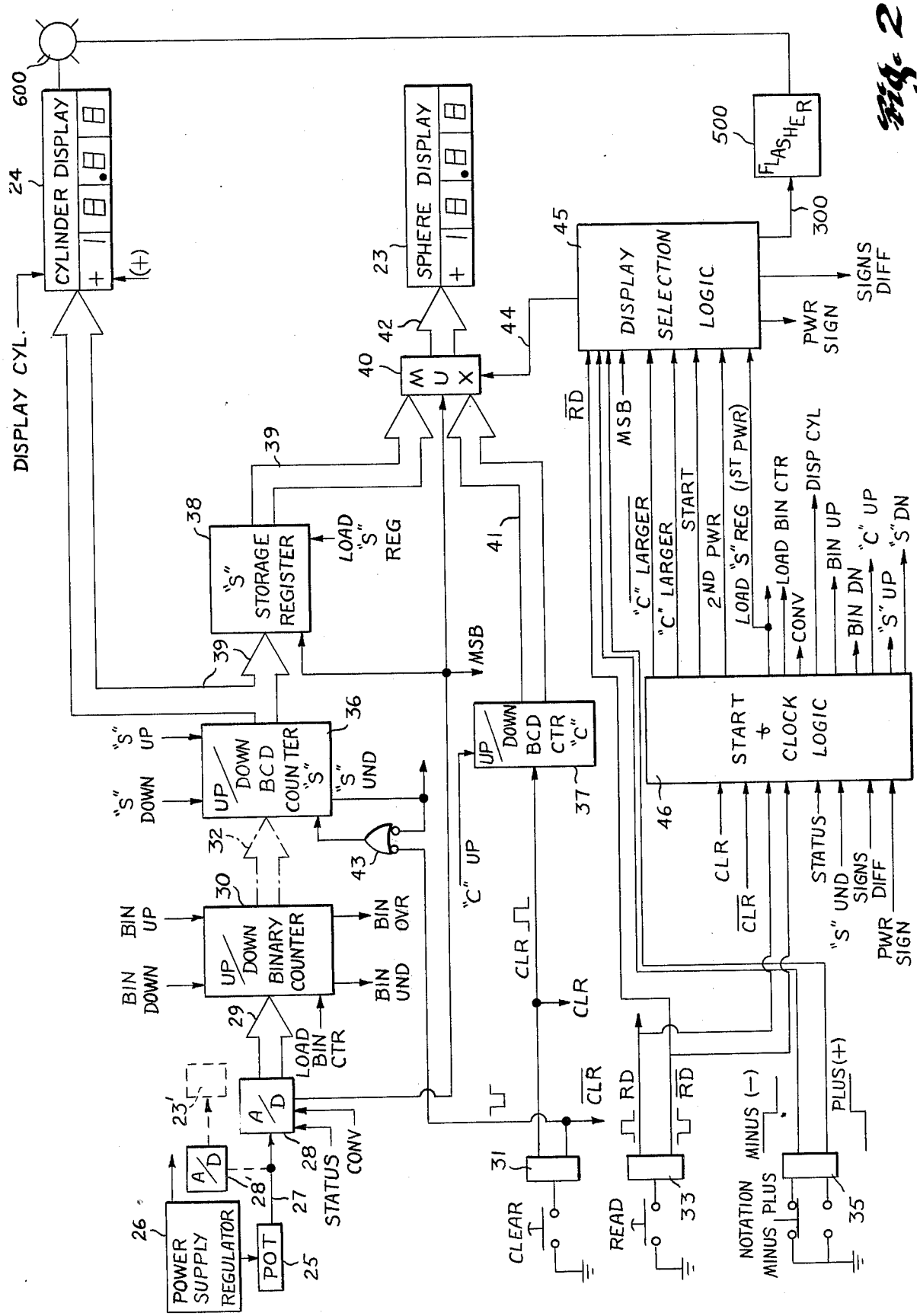
FIG. 2 is a function block diagram illustrating the signal processing and display circuitry of the apparatus of the invention.

The principal function of the circuitry illustrated in FIGS. 2-4 is the conversion of the two sequential voltages appearing at the wiper of potentiometer 25, and corresponding with the net refractive power of the lens 18, to the prescription form of the lens power for readout at display 22. The following discussion will assume that the test lens 18 has "cylinder" and thus possesses two orthogonally disposed principal meridians each having a different power. It will be appreciated, however, that if lens 18 only possesses sphere power its net refractive power will appear in sphere display 23 and a zero value will be read out in the cylinder display 24.

Referring now specifically to FIG. 2, the voltage appearing on the wiper of potentiometer 25 is extended, as represented by line 27, to the analog input of A-to-D converter 28. The A-to-D converter 28 converts the analog input signal to a 12-bit complementary twos complement (CTC) code at twelve respective outputs of the converter appearing collectively as output conductor 29 which is applied to the 12 respective preset inputs of an up/down binary counter 30. The use of a 12-bit CTC code in which the most significant bit is reserved for indicating the sign of the power, enables a resolution of the power readout in one-hundreths of a dioptor, assuming potentiometer 25 permits a commensurate degree of voltage resolution.

The clearing and initializing of the various circuit elements is effected prior to receiving the first reading for a lens from potentiometer 25 by actuation of pushbutton switch "CLEAR", which acts through a conventional "debounce" circuit 31 to generate a control signal voltage in the high ("1") state, indicated as CLR, while the switch remains actuated. The inverse of the CLR signal appears at the inverse output of the debounce circuit 31 and is designated as $\overline{CLR}$.

The actual entry of a particular lens power value from potentiometer 25 to the processing circuitry, and the subsequent control of the processing of the entered lens power value, is determined by actuation of the pushbutton switch READ which acts through the debounce circuit 33 to provide control signal RD in the logic "1" state when actuated. Similarly, the inverse of the RD control signal is provided at the inverse output of the debounce circuit 33 and is designated $\overline{RD}$.

The control of the notation (plus or minus) appearing as a readout on the cylinder display 24 is determined by a two-state toggle switch designated "NOTATION". Actuation of the NOTATION switch to the MINUS state acts through a debounce circuit 35 to provide a control signal which goes to the "1" state and is designated as the MINUS control signal. Similarly, when the NOTATION switch is actuated to the PLUS state, the complementary output of the debounce circuit 35 goes to the "1" state to provide the PLUS control signal.

When using the focimeter 10 to determine each of the two net refractive powers of a lens 18 possessing cylinder, and assuming the instrument has first been zeroed, the power wheel 19 is rotated until a first condition of focus is detected by the operator. That first condition of focus, as represented by an output voltage from potentiometer 25, will be termed hereinafter as the first reading or first curve or first measured power. That first curve is then read into the signal processing circuitry by actuation of the READ switch. Subsequently, the second net refractive power of the lens 18 is determined by rotating the power wheel 19 to bring certain second target lines extending orthogonally of first target lines into focus, thereby establishing a second reading, second curve or second measured power. Intermediate the determination of the first and second net refractive powers of lens 18, the axis wheel 21 is rotated to the extent necessary to eliminate any discontinuity in the orthogonally extending target lines, thereby establishing the angle of one of the two principal meridians.

The CTC coded value of the lens power loaded into binary counter 30 is converted into a straight binary form by forcing the counter 30 to count down to an underflow condition if the sign of the measured power is minus, and to count up to an overflow condition if the sign of the measured power is plus. The sign of the measured power is determined by noting the most significant bit (MSB) in the respective CTC code and is used to generate either a binary down (BIN DN) or a binary up (BIN UP) signal as required for application to binary counter 30. While counter 30 is counting down to an underflow condition or up to an overflow condition, clock pulses are enabled to be applied either to the count up ("S" UP) or the count down ("S" DN) inputs of a so-called "S" BCD counter 36 for the first and second measured powers and to the count up ("C" UP) input of a so-called "C" BCD counter 37 for only the second measured power. When the binary counter 30 reaches either overflow or underflow, the appropriate signal, BIN OVR or BIN UND respectively, is generated and serves to disable the clock which was controlling that counter, the up or down count in "S" counter 36, and the possible up count in "C" counter 37. Because this transfer of the count in binary counter 30 to "S" counter 36 is accomplished in the aforedescribed indirect manner, the interconnection of the two counters is represented by a dotted data transfer connection 32.

In a manner to be described hereinafter in greater detail, the first measured power is temporarily stored in "S" counter 36 and more permanently stored in a so-called "S" storage register 38 by parallel transfer of the date in counter 36 to register 38 via data input 39. Further, the "C" UP input to the "C" BCD counter 37 is only enabled for the second power such that only the second power is ever entered in counter 37. In that manner counter 37 provides a more permanent storage of the second power in the same manner as storage register 38 stores the first power. The parallel outputs of "S" storage register 38 are applied by a data transfer connection 39 to a respective set of inputs on multiplexer 30, and the parallel outputs of the "C" counter 37 similarly applied via data transfer connection 41 to respective alternate inputs of multiplexer 40. The output of multiplexer 40 is extended via the plural conductors of data transfer connection 42 to the sphere display 43 such that either the contents of "S" storage register 38 or alternately, "C" counter 37 may comprise the power appearing at the sphere display.

The data transfer connection 39 from the "S" counter 36 is additionally extended to the cylinder display 24 to provide for readout of the cylinder power component. However, the cylinder power is neither the first nor the second measured power but in fact the arithmetic difference therebetween. This arithmetic difference is determined by modifying the first measured power temporarily retained in "S" counter 36 by an amount having the magnitude or value of the second measured power. If the notations or signs of the first and second measured powers differ, then the second power is added to the first power already stored in the counter 36 such that the total count therein is increased. If, on the other hand, the signs of the two powers are the same, then the counter 36 is forced to count down by an amount equal to the magnitude of the second measured power by enabling the "S" DN input to the counter. If the magnitude of the second measured power is greater than that of the first measured power, then the counter 36 will count down to zero at which point the "S" UP input thereto is enabled and the counter begins counting up until the driving clock is disabled by an overflow or underflow output from binary counter 30. An underflow signal "S" UND from BCD counter 36 is extended to the reset input thereof via NAND gate 43 to insure that the counter is zeroed prior to the count up. The CLR signal is also extended through NOR gate 43 to the reset input of counter 36.

In the foregoing manner, the count remaining in the "S" BCD counter 36 following the entry of the second measured power will correspond with the magnitude of the component of cylinder to be read out to display 24. Inasmuch as this cylinder component value appears on data transfer connector 39 only following entry of the second measured power, the cylinder display 24 is activated by a control signal DISP CYL applied thereto only following entry of the second measured power. The notation or sign displayed for the cylinder readout will be plus (+) if the NOTATION switch is in the plus state and minus (−) if in the minus state.

A multiplexer control signal, represented by line 44 from display selection logic 45, determines which of the two measured powers will be applied via data transfer line 42 to the sphere display 23 following entry and initial processing of the second measured power. This determination is a function of the state of the NOTATION switch (PLUS or MINUS), the signs or notations of the first and second measured powers, and the relative magnitudes of the first and second measured powers. These determinations are made by the Display Selection Logic 45 which, with the Start and Clock Logic 46 therein described in greater detail with reference to FIGS. 3 and 4 respectively.

Referring first to the Start and Clock logic of FIG. 4, the various bistable circuit elements (including the counters of FIG. 2) are all initialized or cleared by actuation of the CLEAR switch to generate CLR and $\overline{\text{CLR}}$ pulses of opposite polarities but occurring at the same time, as required by the differing reset polarity requirements of the various circuit elements. A clock source 47 provides clock pulses CLK, for instance at a frequency of 20 KHz, for the gated driving of the various counters 30, 36 and 37.

When a first curve or power has been determined with focimeter 10, the operator actuates the READ switch which applies a RD pulse to the input of a one-shot 48 which in turn generates a conversion pulse CONV at its output and which is extended to the appropriate input of A-to-D converter 28 for converting the analog data to its digital form. As soon as the conversion has been completed, the A-to-D converter 28 generates the STATUS signal indicating completion of the conversion and which is applied to an appropriate input of one-shot 49 to generate a LOAD BIN COUNTER command at the one-shot's output. The LOAD BIN COUNTER command is extended to the appropriate inputs of UP/DOWN binary counter 30 for loading the digital data from converter 28 thereinto. A complementary output one-shot 49 provides a START pulse, extended to the input of a one-shot 50, to the clock inputs of J-K flip-flops 51, 52, 53, and to a strobe input of the power notation latch 54 (illustrated in FIG. 3). The trailing edge of the START pulse applied to one-shot 50 results in an output pulse therefrom being extended via line 55 to the clock input of J-K flip-flop 56. The J input of flip-flop 56 receives an input via line 57 from the $\overline{Q}$ output of J-K flip-flop 52, which output has been initialized to the "1" state. With the J input of J-K flip-flop 56 enabled, the pulse appearing on line 55 serves to set the Q output to a "1", which output is applied via line 58 to the input of NAND gate 59 enabling the CLK pulses to be extended therethrough and through inverter 60 to the clock buss 61 which is extended to one of the two inputs of each of the NAND gates 62, 63, 64, 65 and 66 respectively.

The trailing edge of the first START pulse applied to the clock input of J-K flip-flop 51 serves to drive the Q output thereof from a "0" to a "1", this output being extended via line 67 to the J inputs of flip-flops 52 and 53 respectively. The signal on line 67 remains high ("1") for both the first and second power reading. However, because the J inputs of flip-flops 52 and 53 were low at the moment the first START pulse was received at their respective clock inputs, their Q outputs remain low until the second START pulse is received whereupon they both go to the "1" state. In this manner, the Q outputs of flip-flops 52 and 53 are high only following the second actuation of the READ switch. The Q output of flip-flop 52 is extended via lines 68 to an input of NAND gate 66, an input of NAND gate 70, and an input of NOR gate 71, and to an input of NAND gate 72 (illustrated in FIG. 3). Similarly, the Q output of flip-flop 53 is extended via line 69 to an input of NAND gate 73. The other input to NAND gate 73 receives an input via line 74 from the output of NOR gate 75 (illustrated in FIG. 3). The signal appearing on line 74 is low if the signs of the two measured powers are different, as will hereinafter be explained.

A signal appearing on line 76 from latch 54 in FIG. 3 is indicative of the sign of the measured lens power entered by the immediately preceding actuation of the READ switch. Line 76 is extended to an input of NAND gate 65 and to the inverter 77 which inverts the signal appearing on line 76 and applies it to an input of NAND gate 64. The signal appearing on line 76 is a "1" if the sign of the particular measured power is plus.

Accordingly, when the sign of the measured lens power just entered is plus, NAND gate 65 provides the BIN UP clock pulses at its output for extension to counter 30, and alternatively, when the sign of the particular measured power is minus the BIN DN clock signal appears at the output of NAND gate 64 for extension to counter 30. In either event, the clock is available to counter 30 only while gate 59 is enabled, and terminates when J-K flip-flop 56 is reset by the application of a RESET pulse thereto. This resetting of flip-flop 56 occurs whenever counter 30 reaches the overflow or underflow state and generates a BIN OVER or BIN UND control signal respectively, either of which signal will reset flip-flop 56 by their extension through the inputs of NAND gate 78 and the subsequent input of NOR gate 79 to the CLR input of the flip-flop.

Following entry of the first measured power, the Q output of flip-flop 53 remains low and accordingly, the output of NAND gate 73, as represented by line 80, is high. Line 80 is applied as one of the inputs to NAND gate 62 and to the inverter 81 having its output extended to the input of NAND gate 63. With the level of line 80 being high, NAND gate 62 enables the clock to appear at its output as the "S" UP clock which is extended to counter 36 for counting in the upward direction. Subsequently, when the second measured power reading has been entered, the Q output of flip-flop 53 goes high, allowing the SIGNS DIFF signal on line 74 to determine the direction in which "S" counter 36 counts as a function of whether the signs of the first and second measured powers were the same or different. If the signs were different, NAND gate 62 continues to provide clock pulses to the "UP" input of counter 36. If the signs were the same, NAND gate 63 begins to provide clock pulses to the "DOWN" input of counter 36 for driving it in a downward direction. In the event counter 36 is driven to zero and experiences underflow, the "S" UND signal acts through one-shot 82 and NOR gate 84 to reset the J-K flip-flop 53 such that the "S" DN clock input counter 36 is disabled and the "S" UP input is enabled, thereby entering the remaining count in an upward direction from zero.

The "S" UND signal is applied to the trigger input of one-shot 82, the output of which is extended via line 85 to NOR gate 84 and to the clock input of J-K flip-flop 83. The Q output of flip-flop 83, which is initially set to the low state by the $\overline{\text{CLR}}$ signal, will be set to the high or "1" state to provide a clock pulse on 85 if one-shot 82 sees a "S" UND signal. In this way, assuming that the first and second measured powers are of the same sign, a "1" at the Q output of flip-flop 83 is indicative of the second measured power being larger than the first, and conversely, (when both powers have the same sign) a "1" at the $\overline{Q}$ output of flip-flop 83 is indicative of the first power being equal to or larger than the second power.

The Q output of flip-flop 52 is applied to the input of NAND gate 66 such that the clock pulses applied to the other input of that NAND gate are passed therethrough only during the counting period associated with the second measured power. The output of NAND gate 66 comprises the "C" UP signal which is extended to the "C" BCD counter 37 for driving its count in an upward direction from zero.

The Q output of flip-flop 52 is also applied, via line 68, to an input of NOR gate 71, the other input to that gate being extended thereto via line 86 from the output of NOR gate 87. The CLR signal provides one input to NOR gate 87, with the other input thereto being provided by the output of one-shot 88. One-shot 88 is triggered, via line 89, by the $\overline{Q}$ output of flip-flop 56 going to the high state, as occurs when binary counter 30 reaches the underflow or overflow state at the end of a count entry. Accordingly, NOR gate 71 provides a LOAD "S" REG signal pulse extended to "S" register 38 only following the temporary storage of the first measured power in "S" counter 36.

NAND gate 70 and its associated output inverter 90, extend a DISP CYL control signal to the cylinder display 24 such that the display is enabled only when the data input thereto via line 39 is representative of the cylinder power. The Q output of flip-flop 52 is applied as one input to NAND gate 70 with the other input being provided by the $\overline{RD}$ control signal. In this way, the cylinder display 24 is enabled only after the READ switch has been released following the entry of the second measured power, thereby allowing sufficient time for the development of the cylinder power value in "S" counter 36.

Referring now to the display selection logic 45 of FIG. 3, the most significant bit of each of the first and second measured powers is extended to a pair of inputs of latch 54 at the time of their respective occurrences. The latch 54 includes a pair of outputs, one represented by output lead 76 and the other represented by output lead 91. A pair of strobe inputs to latch 54 are represented by the LOAD "S" REG control signal and the START control signal. The LOAD "S" REG strobe occurs only following entry of the first power and operates to shift the most significant bit appearing at the input of latch 54 to the output represented by lead 91. However, the strobe signal represented by the START control signal occurs with the entry of both the first and the second measured powers and accordingly, operates to successively shift the most significant bit of the first and second powers successively to the latch output represented by lead 76. In this manner, the most significant bit representative of the sign of the first power is maintained in output lead 91, whereas the most significant bit representative of the sign of the second measured power appears on output lead 76 following entry of the second power.

The sign of the first power, appearing on lead 91, is extended to a negated input of NOR gate 92, through inverter 93 to an input of NOR gate 94, to an input of NOR gate 95, and also to an input of NAND gate 96. The sign of the second measured power, as represented by the lead 76, is extended through inverter 98 to the other input of NOR gate 92, to the other input of NOR gate 94, to the other input of NOR gate 95, and also to the other input of NAND gate 96. Inasmuch as the display selection logic is utilized essentially only after entry of the second measured power as will be hereinafter described, discussion of the states of various parameters will be referenced to the time following entry of the second measured power. The output of NOR gate 92, represented by line 97, is high if the sign of the first measured power was low (minus) and the sign of the second measured power has high (plus). The output of NOR gate 94, as represented by line 98, is high if the sign of the first measured power was high (+) and the sign of the second measured power was low (−). The values appearing on lines 97 and 98 are each extended to respective inputs of NOR gate 75, the output of which comprises the SIGNS DIFF signal represented by line 74 and which is low if the first and second power signs are different and high if their signs are the same.

The output of NOR gate 95, represented by line 110, is high if the signs of both the first and second measured powers were low (−). The output of NAND gate 96 is extended through inverter 111, the output of which is represented by line 112 which is high if the sign of both measured powers was high (+).

The six NAND gates 120, 130, 140, 150, 160 and 170 serve to evaluate the status of the NOTATION switch, the sign status of each of the two measured powers, and the magnitudes of the two measured powers to provide the ultimate control signal appearing on line 44 for determining which data input, 39 or 41, the multiplexer 40 passes to its output 42. The signal appearing on line 112 is extended to the inputs of NAND gates 120 and 150. The signal appearing on line 110 is applied to the inputs of NAND gates 130 and 160. The signal appearing on line 98 is extended to the input of NAND gate 140. The "C" $\overline{\text{LARGER}}$ signal is applied to the inputs of NAND gates 120 and 160. The "plus" state of the NOTATION switch is applied to the inputs of NAND gates 120 and 140, and the "minus" state of the NOTATION switch is applied to the inputs of NAND gates 150, 160 and 170.

The Boolean expressions of the respective NAND gates 120-170 are indicated at their outputs 220, 230, 240, 250, 260 and 270 respectively. A legend associated with FIG. 3 equates the alphabetical characters in the Boolean expression to the functional values applied as inputs in the NAND gates. The signal on line 220 is low when the NOTATION switch is plus, the first and second measured powers are plus, and the second measured power is larger than the first. The signal on line 230 is low when the NOTATION switch is plus, the first and second measured powers are minus and the second measured power is not larger than the first measured power. The signal appearing on line 240 is low when the NOTATION switch is plus and the second measured value is plus and the first measured value is minus. The signal appearing on line 250 is low when the NOTATION switch is minus, the first and second measured powers are plus and the second measured power is not larger than the first measured power. The signal appearing on line 260 is low when the NOTATION switch is minus, the first and second measured powers are minus and the second measured power is larger than the first. The signal appearing on line 270 is low when the NOTATION switch is minus and the first measured power is plus and the second measured power is minus.

The signals appearing on lines 220, 230, 240, 250, 260 and 270 are extended to respective inputs of NAND gate 72. Further, the signal appearing on line 68 and being in a high state only following the entry of the second measured power, is applied to the remaining input of NAND gate 72. The low state signal appearing on line 68 between the first and second power readings serves to lock out the other inputs to NAND gate 72 and provides a high signal on output lead 300 which is extended to an input of NAND gate 400 and to the triggering input of a flasher circuit 500. The $\overline{RD}$ signal is applied to the other input of NAND gate 400.

The multiplexer 40 is responsive to a low level on line 44 to extend the first measured power stored in register 38 to the sphere display 23 and alternatively, is responsive to a high level to extend the second measured power stored in "C" counter 37 to the sphere display. Thus it will be seen in the illustrated embodiment that while the system is between the first and second power entries, and assuming the READ switch has been released, the signal on line 44 will be low and the first measured power will appear on sphere display 23.

However, following entry of the second measured power, the output on line 300 will be high and the output on line 44 low if anyone of the Boolean expressions on lines 220-270 is true (low state), thereby displaying the first measured power on display 23 as the sphere component of power for the lens. Conversely, if none of the outputs 220-270 are true (i.e. all are high) the signal on line 44 will similarly be high and result in the second measured power stored in counter 37 appearing in the display 23 and comprising the sphere component of lens power. If it is wished to display the second measured power comprising the contents of "C" counter 37, the READ switch may be held depressed such that $\overline{RD}$ disables NAND gate 400 and output line 44 goes high to connect counter 37 with sphere display 23.

It will be appreciated that by simply actuating the NOTATION switch from one position (+ or −) to the other, (− or +) the displayed cylinder power changes sign to that of the NOTATION switch following its actuation. Further, because of the change in the NOTATION sign the output of logic 45 also changes, causing a change in which of the two registers, 37 or 38, is displayed as the sphere power, thereby retaining an accurate prescription form of the expression.

An axis verification light 600 is connected in series with a power supply, shown here as associated with cylinder display 24, and a switch where here comprises flasher circuit 500. Assuming that any required adjustment of axis wheel 21 on the focimeter 10 was made intermediate the determination of the first and second measured powers, as is normally the case, the indicated axis angle for the principal meridian of the cylinder component of power will be correct if the first measured power is the one displayed as the sphere power in the prescription-form display. However, if the second measured power appears as the sphere power finally displayed on the display 23, the indicated cylinder axis angle will be incorrect by 90° and is accordingly corrected by the appropriate addition or subtraction of 90° to the indicated value.

It will be recalled that following the entry of the second measured power, output 300 from NAND gate 72 is high if the first measured power is to be displayed as sphere power and low if the second reading is to be so displayed. Accordingly, these two different states serve to control the state of switch 500 and thereby control the "on" or "off" state of verification light 600 to provide an indication of whether or not the angle indicated by axis wheel 21 is accurate for the displayed cylinder power or whether it requires adjustment by 90°.

In the illustrated embodiment, switch 500 is a flasher unit comprised of an astable multivibrator having the signal appearing on line 300 connected thereto such that verification light 600 remains off if the indicated axis angle is correct (first measured power here displayed as sphere) and repeatedly flashes on and off if the indicated axis angle is incorrect (second measured power here displayed as sphere). It will be appreciated that actuation of the NOTATION switch from one sign position to the other results in the opposite operative state of switch 500 and light 600. Thus, when light 600 flashes, the operator may mentally or mechanically appropriately add or subtract 90° to the axis angle indicated by wheel 21. Alternatively, two indicating arrows angularly displaced 90° might be associated with axis wheel 21 and a respective axis verification light associated with each of the two indicator arrows, with the lighting or possibly the flashing of a particular one of the two lights serving to indicate which indicator arrow marks the correct axis angle.

The sphere display portion 23' is illustrated by broken lines as either an adjunct to the regular display 22 previously described, as also is the A-to-D converter 28'. This arrangement allows a continuous read out of the instant power value indicated by the power wheel and its potentiometer 25, particularly if the A-to-D conversions occur at a high rate. Alternatively, it will be appreciated that sphere display portion 23' and sphere display 23 might be one, with the voltage on potentiometer 25 being converted by simulating READ signals at the preselected high rate. However, the simulated READ signals and their control effects would be isolated from that circuitry which recognizes a second READ signal such that each value entered by the simulated READ is treated as a first measured value. Further variations in the display sequence and technique will be easily recognized by those skilled in the art and are embraced by the scope of the present invention.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. The combination comprising a lens measuring instrument for determining the optical powers of a test lens in each of two respectively orthogonal principal meridians, each said optical power being expressed as the net refractive power of said lens in the respective said meridians;

means for providing first and second signed electrical signals whose signed magnitudes are respectively representative of said optical power of said test lens as expressed in terms of said net refractive power in the respective meridian;
   and electronic means at least semiautomatically responsive to said first and second signals representative of said refractive powers in the respective said meridians for providing signals representative of said optical powers expressed in prescription form having a signed net refractive power characterized as sphere power and a signed component of cylinder power and further including means for selectively, alternatively establishing a positive or a negative notation control signal; means responsive to said first and said second signed signals for providing a difference signal representative of the arithmetic difference therebetween, said difference signal assuming the sign established by said notation control signal for readout as said cylinder component of said prescription-form expression; means responsive to said notation control signal, the sign status of said first and second signals and the relative magnitudes between said first and second signals for selecting for readout as said sphere power, when said notation control means indicates a negative notation, said signed first signal if either said first signal is positive and said second signal is negative or both said first and second signals are negative and said second signal is larger or both said first and second signals are positive and said first signal is larger and otherwise said signed second signal and, when said notation control means indicates a positive notation, said signed first signal if either said first signal is negative and said second signal is positive or both said first and second signals are negative and said first signal is larger or both said first and second signals are positive and said second signal is larger and otherwise said second signal; and readout means for said signals indicative of said signed sphere power and said signed cylinder power.

2. The apparatus of claim 1 wherein said means for providing optical power signals expressed in prescription form include means for storing said first signal representative of one said net refractive lens power, and means for storing said second signal representative of the other said net refractive power thereby permitting each particular lens prescription to be displayed alternately in plus cylinder notation or minus cylinder notation in response only to selective alternate establishment of said positive or said negative notation control signal respectively.

3. The apparatus of claim 1 wherein said means for providing said arithmetic difference signal comprises reversible counting means, means for entering the value of said first signal in said counting means, means responsive to the relative signs of said first and second signals for increasing the count in said counting means by the amount of said second signal if the signs of said first and second signals differ and for decreasing the count in said counting means by the amount of said second signal if the signs of said first and second signals are the same.

4. The apparatus of claim 3 wherein said counting means provide a signal indicative of underflow if the count therein decreases to zero and including means responsive to said underflow signal for increasing the count in said counting means by the remaining value of said second signal.

5. The apparatus of claim 1 wherein said lens measuring instrument includes means for indicating the angle of one of said meridians relative to a reference plane, and including signalling means for indicating with which of said two meridians said angle indication is associated.

6. The apparatus of claim 5 wherein said signalling means further comprises means activable to at least two mutually exclusive signalling states, said means being responsive to said first signal being read out as said sphere power for attaining one of said signalling states and being responsive to said second signal being read out as said sphere power for attaining an other of said signalling states.

7. The apparatus of claim 6 wherein said angle indicating means indicates the angle of only one of said meridians and said other of said signalling states of said signalling means is representative of a meridian angle which is orthogonal to said only one indicated meridian angle.

* * * * *